United States Patent [19]

Koffler

[11] Patent Number: 4,676,687
[45] Date of Patent: Jun. 30, 1987

[54] UNIVERSAL BEDSIDE RAIL CLAMP

[76] Inventor: Henry Koffler, 20113 NE. 15th Ct., North Miami Beach, Fla. 33179

[21] Appl. No.: 587,497

[22] Filed: Mar. 9, 1984

[51] Int. Cl.⁴ .......................... F16B 9/02; A47C 21/08
[52] U.S. Cl. .................................... 403/386; 403/389; 403/399; 403/188; 403/384; 5/425; 5/430; 248/228
[58] Field of Search .................................... 5/425-430; 403/386, 387, 389, 399, 245, 246, 49, 188, 385, 384; 248/540, 228, 225.31

[56] References Cited

U.S. PATENT DOCUMENTS

| 1,486,158 | 3/1924 | Price | 403/188 |
| 1,822,558 | 9/1931 | Belding | 403/387 X |
| 2,112,122 | 3/1938 | Sullivan | 248/228 X |
| 2,379,446 | 7/1945 | Krueger | 403/49 X |
| 2,638,301 | 5/1953 | Smith | 403/385 X |
| 2,973,176 | 2/1961 | Malafouris | 248/228 |
| 3,093,839 | 6/1963 | Higgins | 5/429 |
| 3,234,570 | 2/1966 | Hutt | 5/430 |
| 3,351,961 | 11/1967 | Daniels et al. | 5/430 |
| 3,585,659 | 6/1971 | Burst et al. | 5/430 |
| 3,971,083 | 7/1976 | Peterson | 5/430 |

FOREIGN PATENT DOCUMENTS 1252924  11/1971  United Kingdom ................ 403/49

Primary Examiner—Cornelius J. Husar
Assistant Examiner—Todd G. Williams

[57] ABSTRACT

A universal bedside rail Clamp for securing a bedside rail assembly to a hospital or other bed, having a base member for engagement with an angle iron bed frame, a means to tighten the universal bedside rail Clamp to the angle iron bed frame and a means for the bedside rail assembly to pivot in relation to the universal bedside rail Clamp.

3 Claims, 5 Drawing Figures

UNIVERSAL BEDSIDE RAIL CLAMP

BACKGROUND OF THE INVENTION

1. Field of the Invention

This invention deals with an improved bedside rail clamp used on hospital or institutional beds to support and attach a universal bed rail unit to the bed's frame.

2. Description of the Prior Act

Bed rail units are well known and have long been used on beds in institutions and hospitals. Bed rail units keep the patient confined to the bed, preventing the patient from accidentally rolling off or falling out of the bed. Many means have been used to attach said bed rail units to the bed. These means have become complex since in deluxe beds, the top, bottom and middle sections are adjustable such that the patient's head or feet can be raised or lowered. It is thus important that the bedside rail adjust according to the positions of the bed.

Cross bars joining the bedside rail units from each side of the bed have been used to support these bedside rail units. This is typically exemplified in U.S. Pat. No. 3,097,370 issued to C. E. Murcott on July 16, 1963. However, this system proved in practice to include several disadvantages: the adjustable bed rail unit has many parts that must be assembled as well as many adjustments made to attach to the mattress frame, cross-heads 15 & 16 connect to posts 17 & 18 and to cross member 14. This crosshead member is located beneath the mattress and creates a lump in the mattress where it is located. Since a crosshead member is required, there must be a bedside rail unit used on each side of the bed.

SUMMARY OF INVENTION

It is a prime object of the present invention to provide a universal bedside rail clamp that is easily installed on a bed frame, for supporting a bedside rail assembly.

It is a second object of the present invention to eliminate the need for cross bars beneath the mattress that support bedside rails.

It is a third object of the present invention to use individual clamps to support bed rails, whereby each bedside rail is independent of the other side.

It is a fourth object of the present invention whereby a bedside rail can be used on one side of a bed only.

It is another object of the present invention to use single clamps without crossbars for attaching bedside rail assemblies, thereby reducing shipping costs.

It is a further object of the present invention that the clamp need only one screw to attach to the bed frame.

It is yet another object of the present invention to provide a universal bedside rail clamp, which is inexpensive to manufacture and maintain.

BRIEF DESCRIPTION OF DRAWINGS

The invention is illustrated by way of example with the accompanying drawings which form part of this application and in which.

DETAILED DESCRIPTION OF INVENTION

Figure 1:
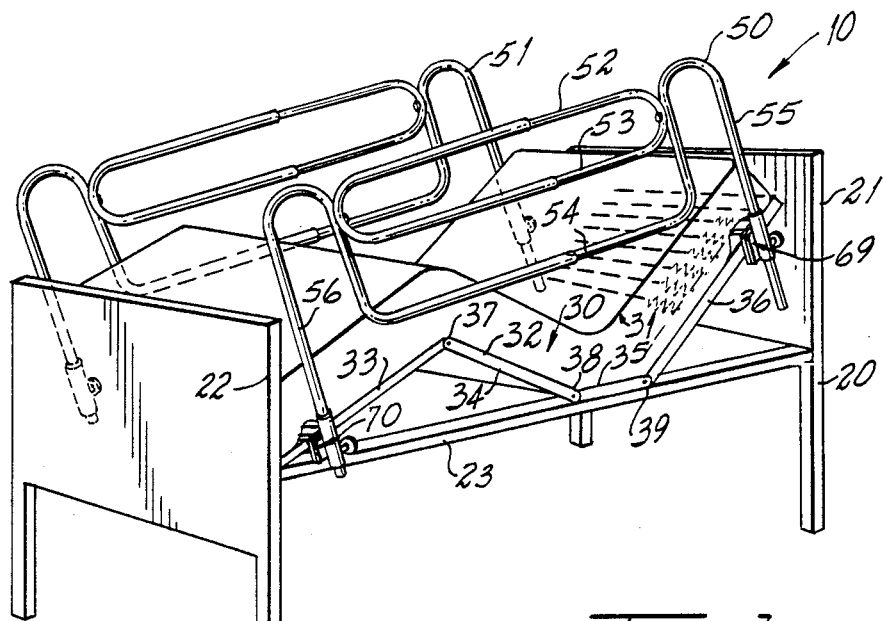
FIG. 1 is a perspective view of an institutional bed having bedside rails attached.
Figure 2:
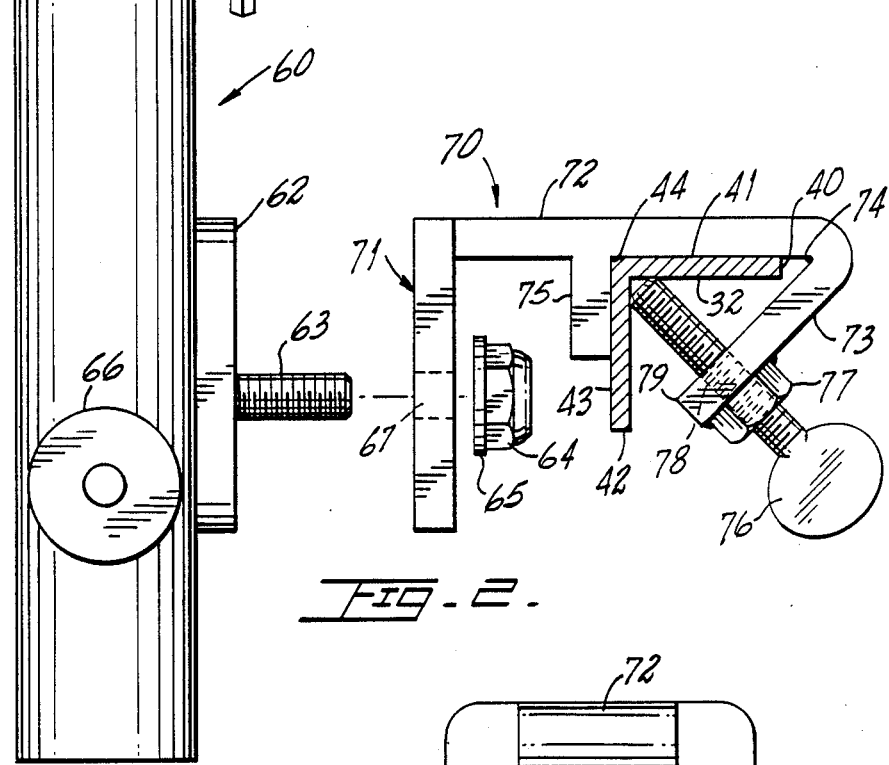
FIG. 2 is an enlarged side view of the universal bedside rail clamp attached to an angle iron of a mattress frame.
Figure 3:
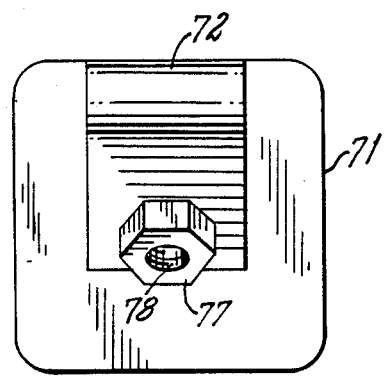
FIG. 3 is an enlarged front view of the universal bedside rail clamp.

Referring to FIGS. 1 and 2, there is shown therein an institutional bed 10, including bed frame 20, mattress assembly 30, bedside rails 50 and 51, universal bedside rail clamps 69 and 70.

Modern institutional beds are equipped to adjust for patient comfort in several positions. The standard bed frame 20 includes headboard 21 and footboard 22 attached by bed frame bar 23.

Attached to the bed frame bar 23 is a mattress assembly 30 including mattress 31 and mattress frame 32. Said mattress frame 32 is shaped similar to an angle iron and has several sections rail 33, rail 34, rail 35 and rail 36, connected by hinge 37, hinge 38 and hinge 39 respectively.

A typical bedside rail 50 is capable of being extended or compressed, to fit the individual bed length or to slideably adjust for raising or lowering mattress assembly 30. As shown in FIG. 1, tubular cylinders 52, 53 and 54 are telescoping in order that bedside rail unit 50 can extend or disextend.

Bedside rail unit 50 is attached to mattress frame 32 on bed 10 as shown in FIG. 1. Posts 55 and 56 located at the ends of bedside rail unit 50 releasably slide within tube assembly 60 (FIG. 2) of universal bedside rail clamps 69 and 70 respectively. Clamp 69 is attached to rail 36 and clamp 70 is attached to rail 33.

Figure 4:
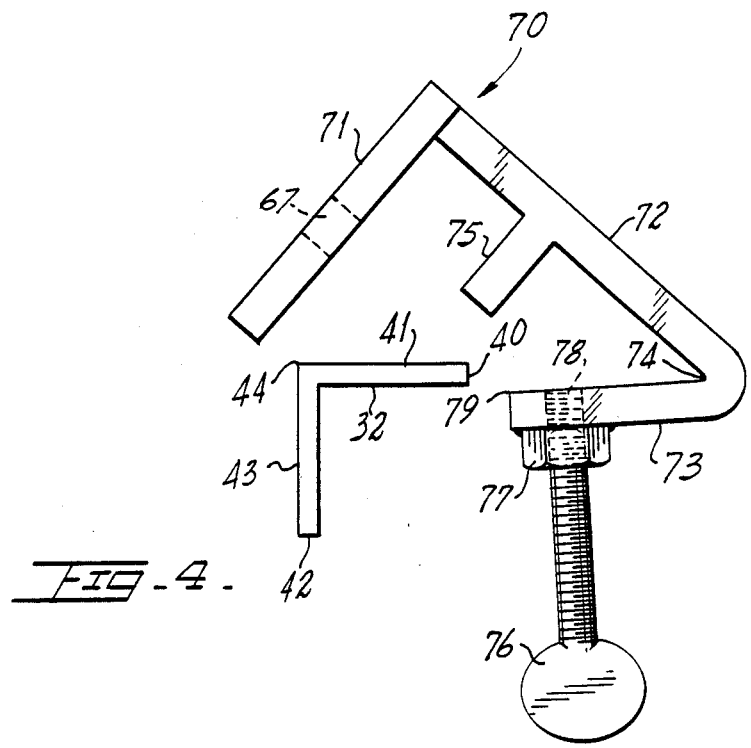
FIG. 4 is a side view of the universal bedside rail clamp in relationship to the angle iron of the mattress frame prior to engagement.
Figure 5:
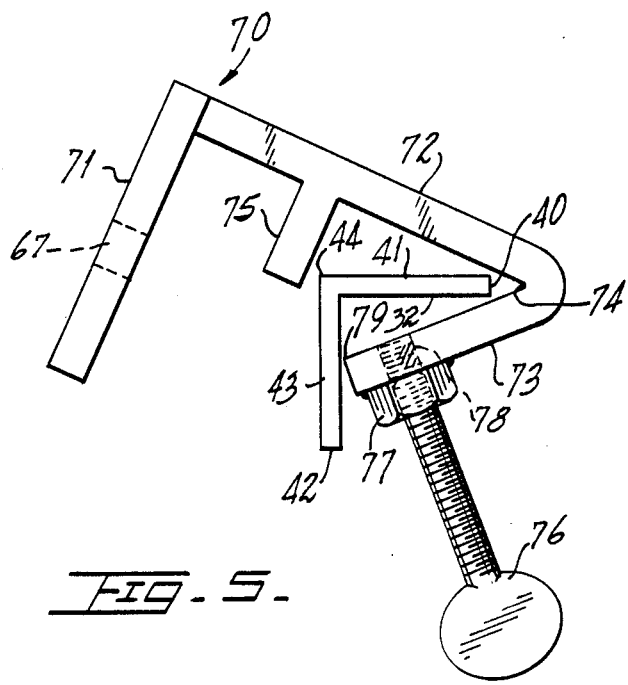
FIG 5 is a side view of the universal bedside rail clamp in relationship to the angle iron of the mattress frame during engagement.

Universal bedside rail clamp 70 releasably engages with mattress frame 32. Mattress frame 32 as shown in cross section in FIGS. 2, 4 and 5, is generally and in this preferred embodiment is an angle iron rail, having horizontal end 40, horizontal face 41, vertical base 42, vertical face 43 and vertex 44 where horizontal face 41 meets vertical face 43. Vertex 44 is opposite an interior corner of mattress frame 32 where the component flanges of the angle iron meet. Horizontal end 40 is the inward facing edge of mattress frame 32.

Universal bedside rail clamp 70 comprises a modified F-shaped member that includes a flat apertured base 71 that in the preferred embodiment is in a vertical position. Extending horizontally from the top of base 71 is a hook member comprising a elongated flange 72, which engages with horizontal face 41 of mattress frame 32. At the end of flange 72 an obliquely directed apertured hook-like member, extends down and back towards base 71, forming an acute angle 74 adjacent to horizontal end 40 of mattress frame 32. Vertical flange 75 is rigidly and permanently attached in this preferred embodiment to flange 72 extending downwardly from said flange 72 intermediate base 71 and acute angle 74 in position, such that vertical flange 75 abuts vertical face 43. Hook like member 73 includes a tightening means having wing-nut actuated bolt 76, nut 77 and opening 78, such that wing-nut actuated bolt 76 is tightened against the interior corner of mattress frame 32, securing universal bedside rail clamp 70 to mattress frame 32 by axial movement of wing-nut actuated bolt 76 toward an inner flange corner formed between intermediate vertical flange 75 and elongated flange 72. The length of intermediate vertical flange 75 and that of the obliquely rearwardly and downwardly extending hook-like member 73 are such that clamp 69 or 70 has enough room between the free ends thereof to fit around an angle iron when wing-nut actuated bolt 76 is retracted without any difficulty as seen in FIGS. 4 and 5.

Base 71 cooperates with tube assembly 60, which includes cylinder 61, for receiving a corresponding post 55 or 56. Bracket 62 is rigidly attached to cylinder 61. In the preferred embodiment bracket 62 includes bolt 63 rigidly attached to said bracket 62, and a corresponding nut 64 and washer 65. Bracket 62 and bolt 63 cooperate with base 71, through hole 67, such that they are releasably and pivotally connected. Cylinder 61 further includes pull-out spring pin 66 which serves as means to releasably engage with and secure post 55 or 56. Thus vertical tube cylinders 55 and 56 can be raised or lowered. Tube assembly 60 is a common mechanical device used with bedside rails.

In use universal bedside rail clamp 70 can easily and quickly be installed on mattress frame 32, without the use of tools when the wing-nut actuated bolt 76 is sufficiently loosened. The position where needed, here, at rail 33, is located. As shown in FIGS. 4 and 5, universal bedside rail clamp 70 is inserted from above mattress frame 32 at an angle such that the end 79 of hook-like member 73 passes horizontal end 40. Clamp 70 easily slides onto mattress frame 32 until vertical flange 75 passes vertex 44 and acute angle 74 is flush with horizontal end 40, such that flange 72 can be urged downwardly to a horizontal position. universal bedside rail clamp 70 is seated onto mattress rail 32 such that the bottom of flange 72 is flush with horizontal face 41 and vertical flange 75 is flush with vertical face 43. Threaded wing-nut actuated bolt 76 is then tightened, as shown in FIG. 2, to engage directly the interior corner opposite vertex 44, making a secure and perfect fit of universal bedside rail clamp 70 against mattress frame 32.

As can be seen in FIG. 1, two clamps are used for each bedside rail 50 and 51. At first universal bedside rail clamp 70 is attached to rail 33 and a second universal bedside rail clamp 69 is attached to rail 36. Furthermore, it can now be noted that each side of the bed can be installed incependently of the other. Further, it can be noted that no cross bars beneath a mattress are needed. In fact, when the situation dictates so, if the bed was against a wall, only one bedside rail need be used.

While but a single embodiment of the present invention has been here specifically disclosed, it will be apparent that many variations may be made therein, all within the scope and spirit of the invention.

What is claimed is:

1. A universal bedside rail clamp for securing a movable bedside rail to an angle iron rail of a mattress supporting frame on a bed consisting essentially of a modified F-shaped structure comprising a base having a hole, an elongated flange extending forward nowmal from said base and having an obliquely directed hook-like member starting at the end of said elongated flange and extending downward and rearward toward said base, said hook-like member being turned at an acute angle to said elongated flange, an opening through said hook-like member, a flange parallel to said base extending from said elongated flange between said base and said start of said hook-like member to form an inner corner opposite said opening, said hook-like member having a threaded means in conjunction with said opening, a wing-nut actuated bolt engaging said threaded means for being axially adjustable through said opening for movement toward and away from direct engagement with said inner corner to clamp said angle iron rail directly against said elongated flange and said intermediate flange in the vicinity of said inner corner, the length of said intermediate flange and that of said obliquely extending hook-like member being such that there is sufficient free space between the free ends thereof for said clamp to fit around said angle iron rail when said wing-nut actuated bolt is retracted.

2. A universal bedside rail clamp as in claim 1, wherein said hole in the base receives a threaded bolt therethrough, a nut clamping said threaded bolt on one side of said base, a bracket fixed to the other end of said bolt on the other side of said base, a cylinder secured to said bracket on the opposite side of said threaded bolt, said cylinder being constructed and arranged to slidably and adjustably receive a post forming part of said movable bedside rail, whereby said threaded bolt through said base serves as a pivot axis for pivotally adjusting and securing said post to said clamp.

3. A universal bedside rail clamp as in claim 1, for use in securing an angle-iron rail provided with a vertical face, and a horizontal face, wherein said intermediate flange extends in a vertical plane to be flush with said vertical face and said elongated flange extends in a horizontal plane to be flush with said horizontal face when said clamp occupies its clamping position.

* * * * *